Patented Aug. 6, 1946

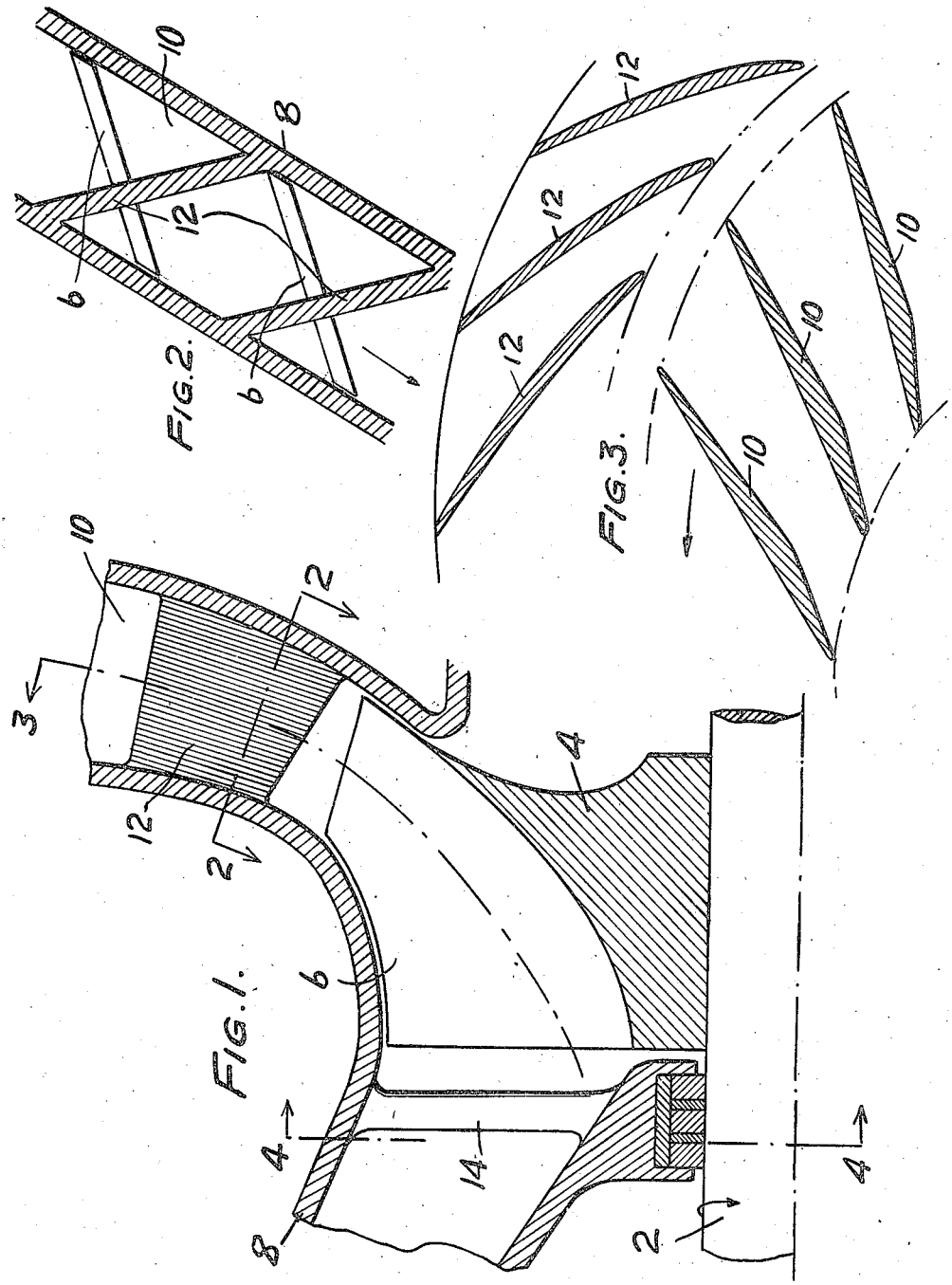

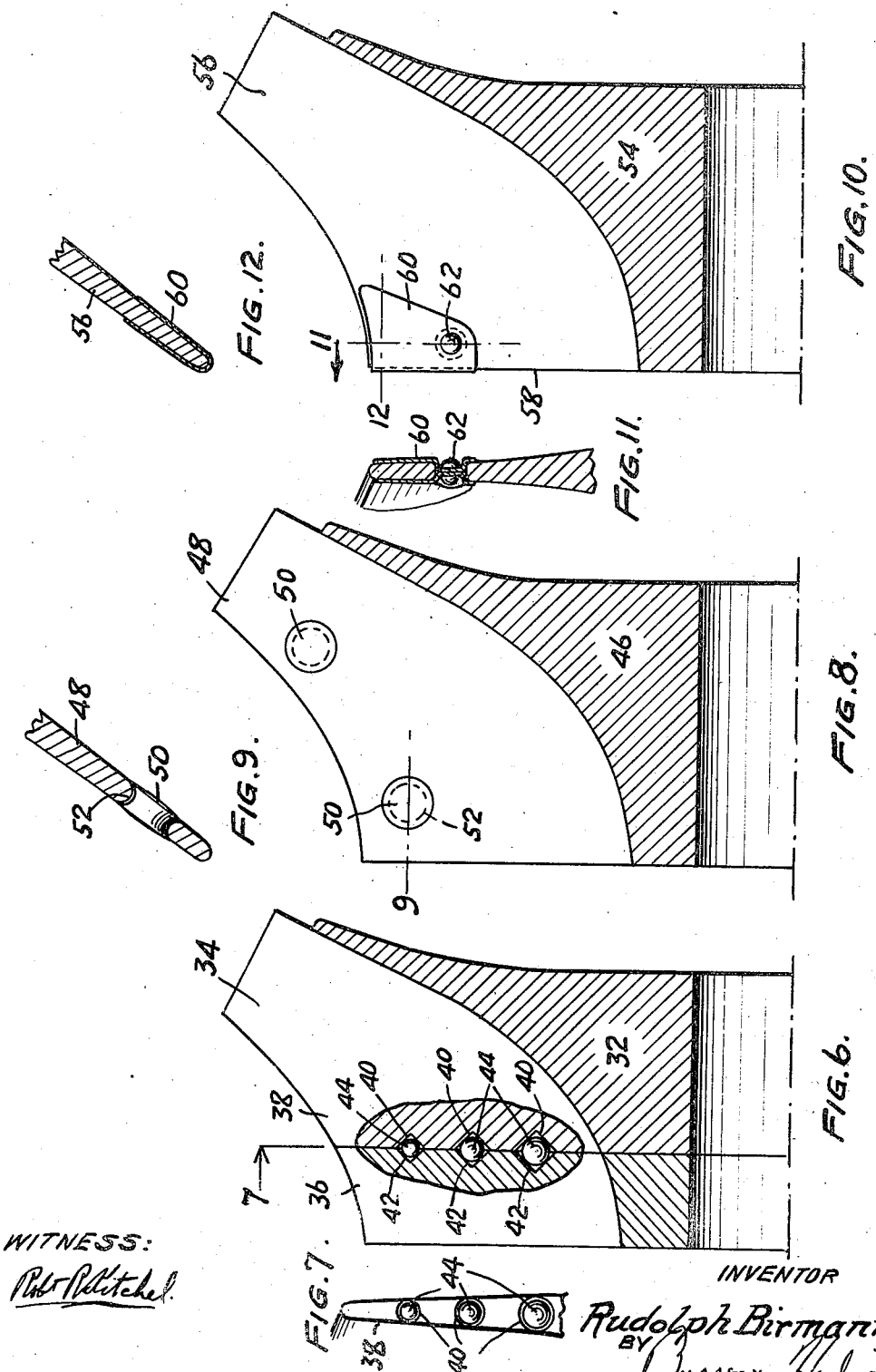

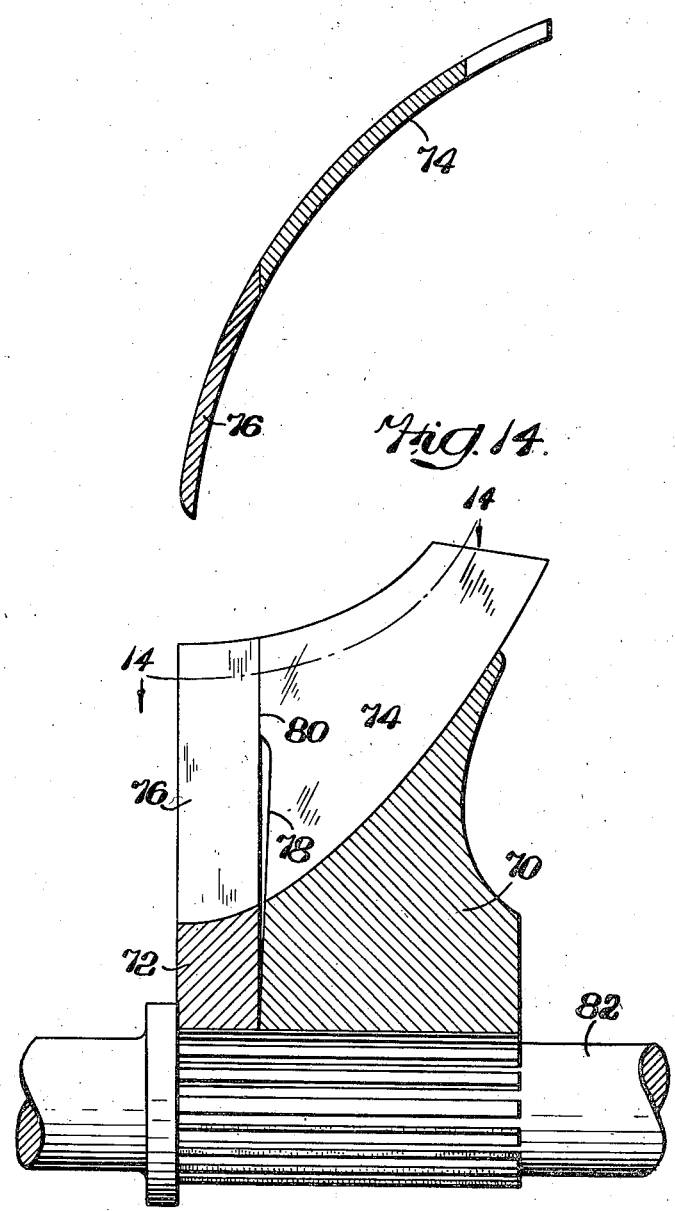

2,405,283

UNITED STATES PATENT OFFICE 2,405,283

ELASTIC FLUID MECHANISM

Rudolph Birmann, Newtown, Pa., assignor, by mesne assignments, to Federal Reserve Bank of Philadelphia, a corporation of the United States of America Application August 19, 1941, Serial No. 407,408

7 Claims. (Cl. 230—134)

This invention relates to elastic fluid mechanism of the type including a rotor comprising a hub portion and vanes extending outwardly therefrom to define elastic fluid passages. The invention is particularly applicable to such a mechanism constituting a centrifugal compressor, though it is equally applicable to a turbine.

In my Patents 1,926,225 and 1,959,703, dated, respectively, September 12, 1933, and May 22, 1934, there are disclosed turbines and compressors having vanes extending substantially radially from hub portions of a rotor to define elastic fluid passages. Compressors and turbines of such types when built for the supercharging of small engines requiring only small volume flows had short and radially narrow vanes which offered no difficulties in operation. For the supercharging of high powered engines, or for other uses involving large power transformation, large volume flows are required, and, for example, the impeller vanes in the case of a centrifugal compressor are large and have large radial and axial dimensions. Under such conditions, their natural frequencies of vibration are sufficiently low so that resonant excitation of vibrations therein may occur in operation, which vibrations, if they build up to sufficient amplitude, may cause failure of the vanes. While turbine passages generally encountered involve vanes of greater thickness than those used for impellers and generally also less surface area, so that their natural frequencies of vibration are substantially above those which may be induced resonantly in operation, it will be understood that the expedients for avoidance of destructive vibration are equally applicable to turbine vanes. For simplicity of description, however, what follows will be discussed with reference to impeller vanes only.

The excitation of vibrations in large size vanes of the type described, which have natural frequencies of vibration substantially lower than the smaller vanes first mentioned above, may be brought about by various causes. For example, there is at a particular speed a certain frequency determined by the sweeping of the outlet edges of the impeller vanes past associated diffuser vanes. Other frequencies will be defined by slight disturbances of flow caused by inlet guide vanes, or bearing housing supporting struts, or by the revolutions per second of the impeller as a whole. The various frequencies thus defined, together with their harmonics, may coincide at some particular speed, or speeds, with one or more natural frequencies of vibration of the impeller vanes. If made of the proper materials of high tensile strength, of proper minimum thickness, and particularly if formed directly by cutting a rotor disc, these vanes are almost ideally constituted to form vibrating members which, if excited by a shock, can be heard to vibrate at various natural musical frequencies, in some cases like bells. The coincidence of exciting vibration frequencies with these natural frequencies tends to promote large amplitude vibrations, causing failure.

The present invention has as its general objects the prevention of vibrations likely to cause damage both by minimizing the impulses likely to be set up during operation and by damping the vibrations of the vanes in the event that impulses still remain of sufficient amplitude to induce large vibration amplitudes in the vanes.

The principles of the invention may be carried out in various ways, and further objects of the invention relating to particular embodiments of the invention will become apparent from the following description, read in conjunction with the accompanying drawings, in which:

Figure 1 is a substantially axial section through half an impeller and associated portions of its housing and diffuser passages, illustrating the application of the invention thereto (in this figure the showing of the vane is conventionalized, it being understood that the vane will, in general, have a substantial skew angle with respect to the axis);

Figure 2 is a partial developed sectional view taken on a conical surface the trace of which is indicated at 2—2 in Figure 1;

Figure 3 is a fragmentary sectional view taken on the surface the trace of which is indicated at 3 in Figure 1;

Figure 6 is a similar axial section through half an impeller showing another vibration damping arrangement;

Figure 7 is a sectional view taken on the plane indicated at 7—7 in Figure 6;

Figure 8 is a view similar to Figure 6, but showing an alternative damping arrangement;

Figure 9 is a fragmentary sectional view taken on the plane indicated at 9 in Figure 8;

Figure 10 is a further view similar to Figure 6, showing still another damping arrangement;

Figure 11 is a fragmentary section taken on the plane indicated at 11 in Figure 10;

Figure 12 is a fragmentary section taken on the plane indicated at 12 in Figure 10;

Figure 13 is a view similar to Figure 5 showing a further modification; and

Figure 14 is a section taken on the surface, the trace of which is indicated at 14—14.

Figure 4:
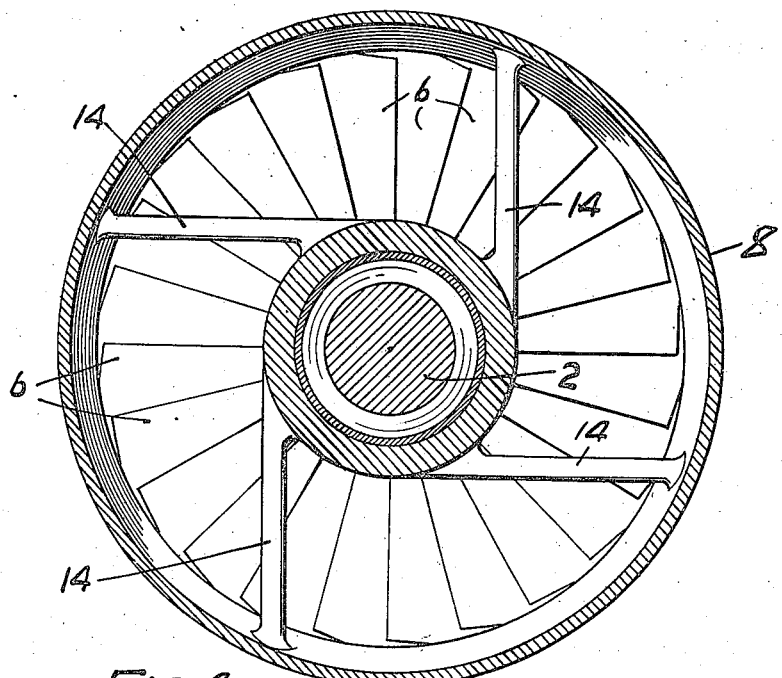
Figure 4 is a transverse section taken on the plane the trace of which is indicated at 4—4 in Figure 1.

Referring first to Figure 1, there is illustrated therein a portion of a centrifugal compressor comprising a shaft 2 and a rotor, consisting of a hub 4 and vanes 6 defining elastic fluid passages, the vanes disclosed being of the form described in my prior patents referred to above. While it will be obvious that the principles of the invention are applicable to other types of vanes as well, the invention is particularly applicable to vanes which are formed by machining passages into a solid disc, as in the case of those described in my prior patents, since the integral anchorage of such vanes with the hubs and their substantial extent from the hub tends to give them natural undamped frequencies of vibration within ranges likely to be induced during operation. The rotor is located within a casing 8, which is only partially indicated to the extent of its portions about the vanes. Discharge takes place into a diffuser 10 provided with guiding vanes indicated at 12. Connection between a bearing housing and the casing is provided through the medium of struts indicated at 14.

In conventional centrifugal compressors, the diffuser guide vanes 12 have their generating elements lying in substantially axial planes and struts such as indicated at 14 are generally arranged in axial planes. Considering first the diffuser vanes, such a disposition of them results in the existence of regions of uneven pressure distributed about the inlet edges of the diffuser vanes, which regions are abruptly entered by the discharge edges of the impeller vanes, which even though they may not lie in axial planes if the inventions of my patents are followed, do not form any large angles with such axial planes. The result is that each of the vanes in passing successive diffuser vane edges is subjected to periodic pressure shocks which, if of a frequency, or having a frequency harmonic, corresponding to a natural frequency of the vanes, will set up dangerous amplitudes of vibration therein.

In accordance with the present invention, the diffuser vanes are not generated by elements lying in axial planes, but are located with their entrance edges at skew angles relative to the axis of rotation extending in a direction opposite the skew angles of the outlet edges of the vanes relative to the axis of rotation. The result, as illustrated in Figure 2, is that in the region at which the exit edges of the rotating vanes are adjacent the inlet edges of the guiding vanes, the respective edges form opposite angles with respect to the direction of relation motion, preferably, as illustrated in Figure 2, being approximately at right angles to each other. They are preferably as nonparallel as possible, i. e., as nearly at a right angle as possible, so that during rotation the edges of the moving vanes and of the guide vanes have progressive overlapping relative motion. The result is that substantially continuously some part, but only a small part, of the edge of each guide vane is passing through a disturbed pressure region. The result is to minimize shocks imparted to the vanes and so reduce very substantially the vibration amplitudes which may be built up under resonance or near resonance conditions. A similar arrangement is provided in the case of the struts indicated at 14 adjacent the entrance edges of the rotating vanes. During operation a wake extends from the rear of each of the struts, providing a region of disturbed flow and pressure varying from that existing in the regions of free flow between the struts. If the struts were radial, it is evident that practically the entire entrance edge of a rotating vane, which entrance edge is substantially radial, would enter such wake at the same time. To avoid this and to secure a progressive overlapping action similar to that described above in connection with the outlet edges of the vanes, the struts are arranged as illustrated in Figure 4, with the result that during a period when the entrance edge of a vane is passing closely adjacent a strut, it forms a substantial angle therewith, with the result that the vane edge passes progressively through the region of the wake, reducing greatly the shock effect due thereto. In other words, while the entrance edge of a rotating vane passes through the same shock region as it would if the strut were radial, the period of passage is prolonged, so that the intensity of the shock is much reduced.

While the expedients just described will in general so reduce the shock excitation of vibrations in rotor vanes as to avoid dangerous conditions, the vanes may, to meet other requirements, have to be of such dimensions as to vibrate very freely without substantial damping if made as single metallic members, for example, machined out of a rotor disc. Under such circumstances, it is desirable to provide damping in the vanes.

Figure 5:
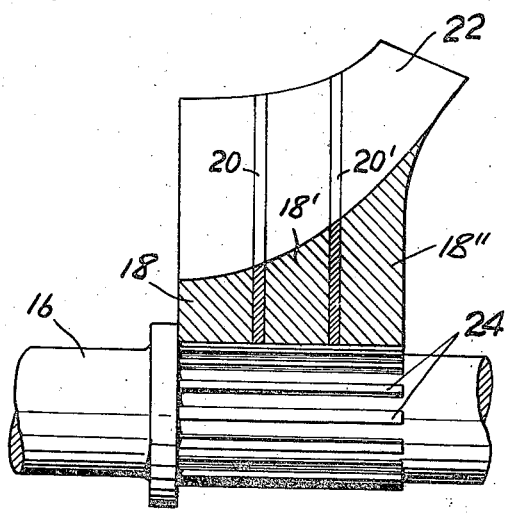
Figure 5 is a substantially axial section through half an impeller showing a modified form of rotor embodying the principles of the invention.

Figure 5 illustrates how such damping may be satisfactorily accomplished. In this case, the shaft 16 carries a rotor comprising metallic portions 18, 18' and 18'' between which are sandwiched non-metallic portions 20 and 20'. The formation of such a rotor may be simply accomplished by uniting the various sections and machining the vanes 22 through all of the sections as a unit. In such case, they may be held in proper position by providing internal spline grooves to fit external spline teeth 24 on the exterior of the shaft 16. The various parts of the rotor may be held together axially by clamping devices, which are not illustrated. It may be noted, however, that the pressure developed at the outlet of the impeller may be used to maintain them together under pressure, in which case it is only necessary to insure that they do not become too loose when the device is stationary or operating at low speeds.

In order to provide proper damping, it is desirable that the thin members 20 and 20' be non-metallic, for example, they may be formed of, or contain, a synthetic resin, being, for example, of the material known as "Micarta" or the like. However, it is also possible to use inserts of different metal than the metal used for the major portions of the rotor, since the boundary surfaces between two dissimilar materials tend to reflect rather than transmit vibrations.

It is, in fact, possible to eliminate the inserts such as 20 and 20' and merely form the rotor in several parts which may be pressed together along radial planes, as illustrated in the modification of Figures 13 and 14. In the modification of these figures, the hub of the rotor is formed in two parts, 70 and 72, carrying the respective vane sections indicated at 74 and 76. The hub section 80 and the vane sections which it carries are undercut as indicated in a very exaggerated fashion at 78 so that contact of the vane sections occurs at 80 along a radial plane. The undercut 78 is preferably only of the order of a few thousandths of an inch, with the result that, due to the pressure gradient across the rotor or additional means tending to move the two hub sections 70 and 72 toward each other, there occurs a spring action whereby contact between the hub portions may occur at the shaft with the production of some predetermined amount of pressure along the contact regions 80. Pressure differences on the two sides of the vanes also cause pressure contact at the regions 80. The two sections of the rotor are maintained in alignment by being splined as indicated to the shaft 82.

In this case as well as in the others described herein, the parts which are coupled together must have different natural frequencies of vibration and of such nature that any order frequency of natural vibration of one vane section will not coincide with the first or any higher order natural frequency of the other vane section. Desirably the frequency of the discharge section is considerably higher than the frequency of the inlet section of each vane. It is also important that the coupling pressure or degree be of the proper amount. For example, in the arrangement of Figure 13, if the coupling pressure at 80 is too great, the two sections of the vane may vibrate as a unit, adopting some natural frequency of the arrangement. The arrangement provided in Figures 13 and 14 permits a close control of the degree of pressure, since the clearance at 78 may be made to control this, i. e., if a very light pressure is found desirable in a particular case, a very slight clearance may be provided which may be increased, with additional increase of mechanical pressure forcing the two sections together if, in a particular instance, closure coupling is found desirable. In any case, the optimum conditions are best found by experiment, material being removed at 78 to the extent necessary to insure the proper coupling to provide the maximum damping effect. The arrangement described in Figures 13 and 14 is particularly desirable where high temperatures may prevent the use of non-metallic insert members. If inserts are desired, however, they may be formed of softer metals even in cases of high temperature operation. The use of a soft material between major metal portions of the rotor tends not only to provide coupling of the inharmonically related parts, but in itself serves to absorb and damp the vibrations.

In Figure 6 there is illustrated an alternative arrangement for the mutual damping of two portions of the rotor which have different natural frequencies of vibration. In this case, the adjacent edges of the two vane parts 36 and 38 of the vanes 34 carried by respective separate portions of the hub 32 are provided with depressions 40 and 42, in which are located balls 44, which may be of steel. It may be remarked that, particularly for aircraft use, impeller rotors of the type described are generally formed from light aluminum alloys of high tensile strength.

With this arrangement, if the two vane sections 36 and 38 have different natural frequencies of vibration, which end is achieved by providing the line of separation in the proper position, as in the case of the modification of Figure 5, the vibration of one section counteracts through the loose links the different vibration of the other section, with the result that high amplitudes of vibration are prevented from building up. The balls 44, furthermore, are relatively loose in the sockets, so that they also contribute to frictional damping of the vibration.

In the modification of Figure 8, the hub 46 carries vanes 48 which, in this case, are not split. They are provided, however, with holes 52, which may be placed about as illustrated, in which are loosely mounted rivets 50. While in Figure 8, two of these are shown in each vane, it is generally sufficient to use only one, and two are shown primarily to illustrate the more desirable relative positions which such rivets may occupy.

In the case of the modification of Figure 10, the hub 54 carries vanes 56. These vanes have inlet edges 58, which are embraced by clip-like members 60, for example, of stainless steel riveted in position by means of rivets 62. The riveting is so done as to cause the clips 60 to have some slight looseness or "shake." Besides acting for damping purposes, these stainless steel clip members serve as shields protecting the more readily abraded material from wear due to the air or gas flow.

The common feature of all the modifications of Figures 5, 6, 8, 10 and 13 is the provision of loose coupling between a vane capable of natural vibration, and some member such as the rivets 50, clips 60, balls 44, or additional vane sections 36 or 76 to produce a damping action of frictional nature by the setting up of some inharmonic vibrations in the member to which the vane or vane section is coupled. The degree of play provided by the loose coupling may be very slight, for example, just perceptible to the fingers, and of the order of only a thousandth or a few thousandths of an inch. That, however, is quite sufficient to produce a damping, which is made very evident by comparison of the sounds occurring if damped and undamped blades are tapped with some hard object. When a damping arrangement is used, the sound is very flat.

To produce satisfactory results, the damping must be provided at some point other than a vibrational node of a vane, and desirably the damping coupling should be provided at that position where a major vibration amplitude of the vane will occur with the damping means absent. These positions of major vibration generally occur along the inlet and outlet edges and along the radially outermost portions of the vanes. Hence the rivets 50 or clips 60 or the balls 40 are preferably located at such positions.

It is found, furthermore, that if the damping coupling is provided at one position of major amplitude or, in fact, at substantially any non-nodal position that is quite sufficient to prevent the building up of dangerous vibration amplitudes in the entire vane. This is the reason why, for example, only one rivet 50 need be provided in a vane or why it is sufficient to have the clip 60 located at the inlet edge without duplication at the outlet edge, which is a region of maximum vibration. In the arrangement of Figure 10, for example, the clip might as well be provided at the outlet edge, from the standpoint of damping action, though, as mentioned above, it is advantageous to provide it at the inlet edge, since, if made of thin stainless steel, it affords wear protection to the inlet edge of the vane.

In the case of the modifications of Figures 5, 6 and 13 there is no interference with the existence of extremely smooth walls of the gas flow passages. In the case of modifications of the types of Figures 8 and 10, however, care must be taken to avoid disturbance of flow, inasmuch as slight disturbances at the high speeds of flow involved will occasion very large losses in efficiency. It is, therefore, quite important to have the rivets or clips or the like offer quite smooth continuity with the adjacent portions of the vane surfaces and to have their degree of looseness such that their free motion cannot produce any substantial changes of geometric contour to occasion disturbance of the flow. Thus, for example, in the case of the arrangement of Figure 10, the hollow surrounding the rivet 62 should desirably be filled in so as to provide smoothness of the surface, and the inner edges of the clips should be tapered off or partially inset in the vane surface to insure smoothness.

It will be evident that the invention may be embodied in various other fashions apparent from the above specific disclosure. It will also be evident, as stated in the introduction to the specification, that what is described herein is applicable to other vanes such as those defining turbine passages if necessity arises for the prevention of destructive vibration.

What I claim and desire to protect by Letters Patent is:

1. An elastic fluid mechanism comprising a rotor having a hub portion and substantially radially extending vanes defining elastic fluid passages having substantial axial extent and shaped to change to a substantial degree the radial component of velocity of elastic fluid flowing therethrough, each of said vanes comprising at least two parts substantially meeting along an outwardly extending line and loosely coupled to each other along said line to provide damping of mechanical vibrations of said vane parts relative to said hub portion.

2. An elastic fluid mechanism comprising a rotor having substantially radially extending vanes defining elastic fluid passages having substantial axial extent and shaped to change to a substantial degree the radial component of velocity of elastic fluid flowing therethrough, each of said vanes comprising at least two parts substantially meeting along an outwardly extending line and loosely coupled to each other along said line to provide damping of mechanical vibrations of said vane parts, said vane parts having different natural frequencies of vibration.

3. An elastic fluid mechanism comprising a rotor having a hub portion and substantially radially extending vanes defining elastic fluid passages having substantial axial extent and shaped to change to a substantial degree the radial component of velocity of elastic fluid flowing therethrough, said rotor being formed in at least two parts so that each of said vanes comprises at least two parts substantially meeting along an outwardly extending line, the central portions of said rotor parts having clearance with each other so that axially applied pressure may effect a predetermined degree of engagement, and loose coupling, between the parts of the vanes to damp vibrations of the vane parts relative to said hub portion.

4. An elastic fluid mechanism comprising a rotor having a hub portion and substantially radially extending vanes defining elastic fluid passages having substantial axial extent and shaped to change to a substantial degree the radial component of velocity of elastic fluid flowing therethrough, each of said vanes comprising at least two parts substantially meeting along an outwardly extending line, the inner parts of said vanes having clearance with each other, and the outer parts engaging each other, along said line, to provide loose coupling under axially applied pressure to damp vibrations of the vane parts relative to said hub portion.

5. An elastic fluid mechanism comprising a rotor having a hub portion and substantially radially extending vanes defining elastic fluid passages, said rotor being formed in at least two parts so that each of said vanes comprises at least two parts substantially meeting along an outwardly extending line, the central portions of said rotor parts having clearance with each other so that axially applied pressure may effect a predetermined degree of engagement, and loose coupling, between the parts of the vanes to damp vibrations of the vane parts relative to said hub portion.

6. An elastic fluid mechanism comprising a rotor having a hub portion and substantially radially extending vanes defining elastic fluid passages, each of said vanes comprising at least two parts substantially meeting along an outwardly extending line, the inner parts of said vanes having clearance with each other, and the outer parts engaging each other, along said line, to provide loose coupling under axially applied pressure to damp vibrations of the vane parts relative to said hub portion.

7. An elastic fluid mechanism comprising a rotor having substantially radially extending vanes defining elastic fluid passages having substantial axial extent and shaped to change to a substantial degree the radial component of velocity of elastic fluid flowing therethrough, each of said vanes comprising at least two parts having different natural frequencies of vibration and loosely coupled to each other to provide damping of mechanical vibrations thereof.

RUDOLPH BIRMANN.